Feb. 28, 1950  E. T. CARLSON  2,498,878
INFRARED BAKING OVEN
Filed May 2, 1944  4 Sheets-Sheet 1
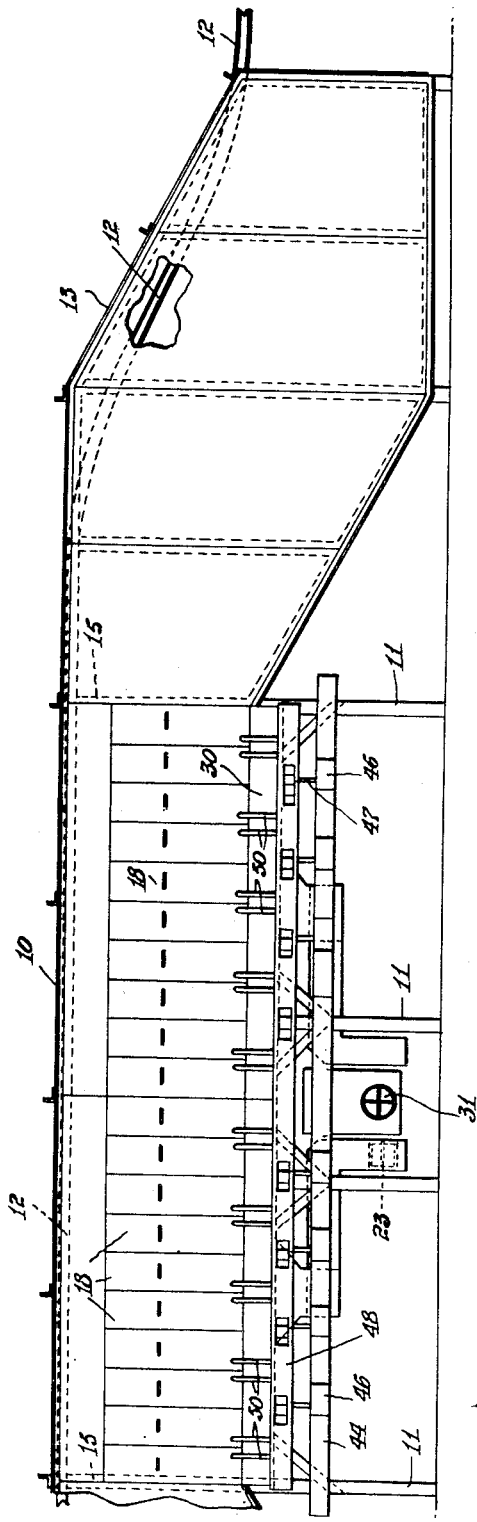
INVENTOR
*Elmer T. Carlson*
BY
ATTORNEY Feb. 28, 1950 E. T. CARLSON 2,498,878
INFRARED BAKING OVEN
Filed May 2, 1944 4 Sheets-Sheet 2
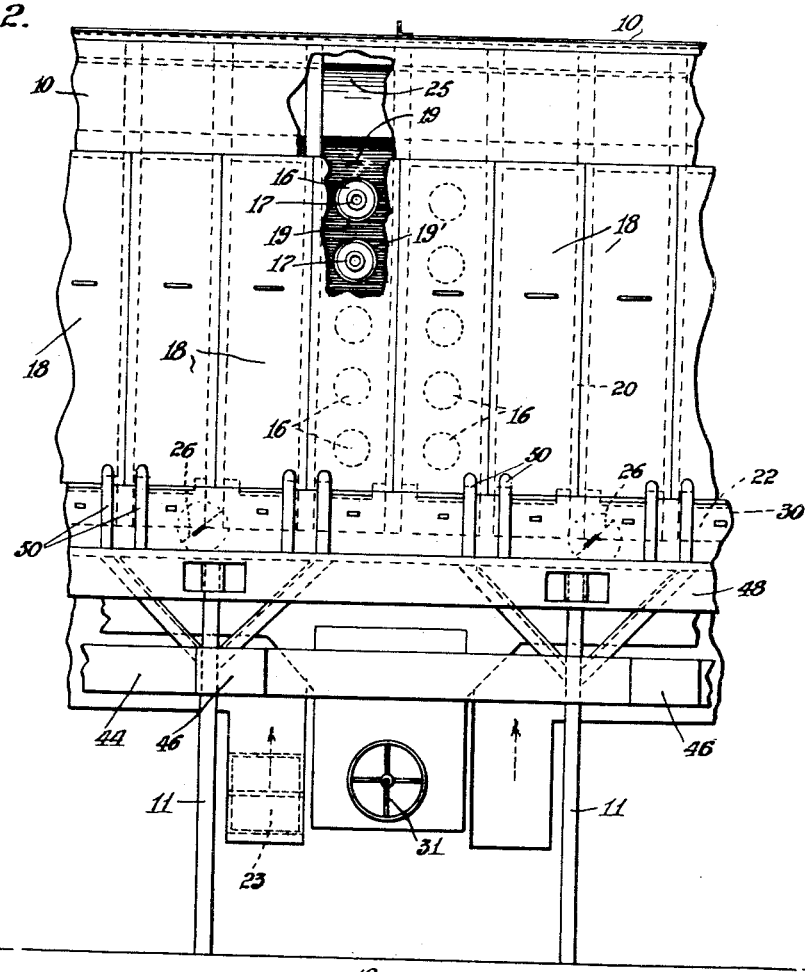
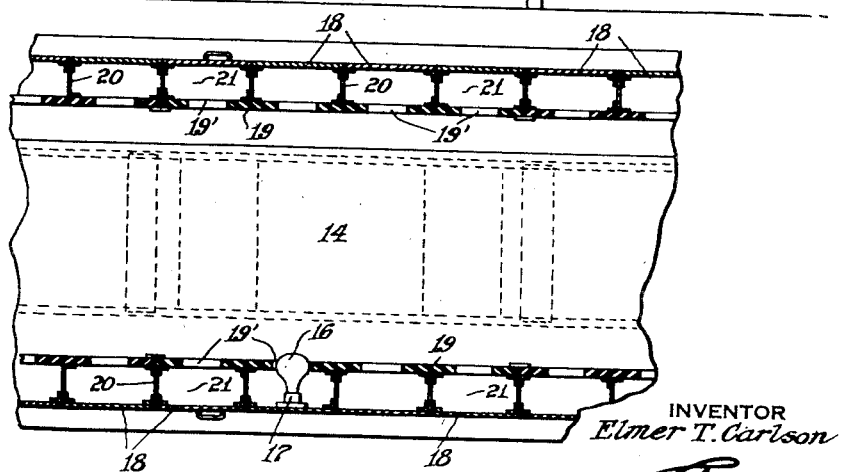
INVENTOR
Elmer T. Carlson
BY
ATTORNEY

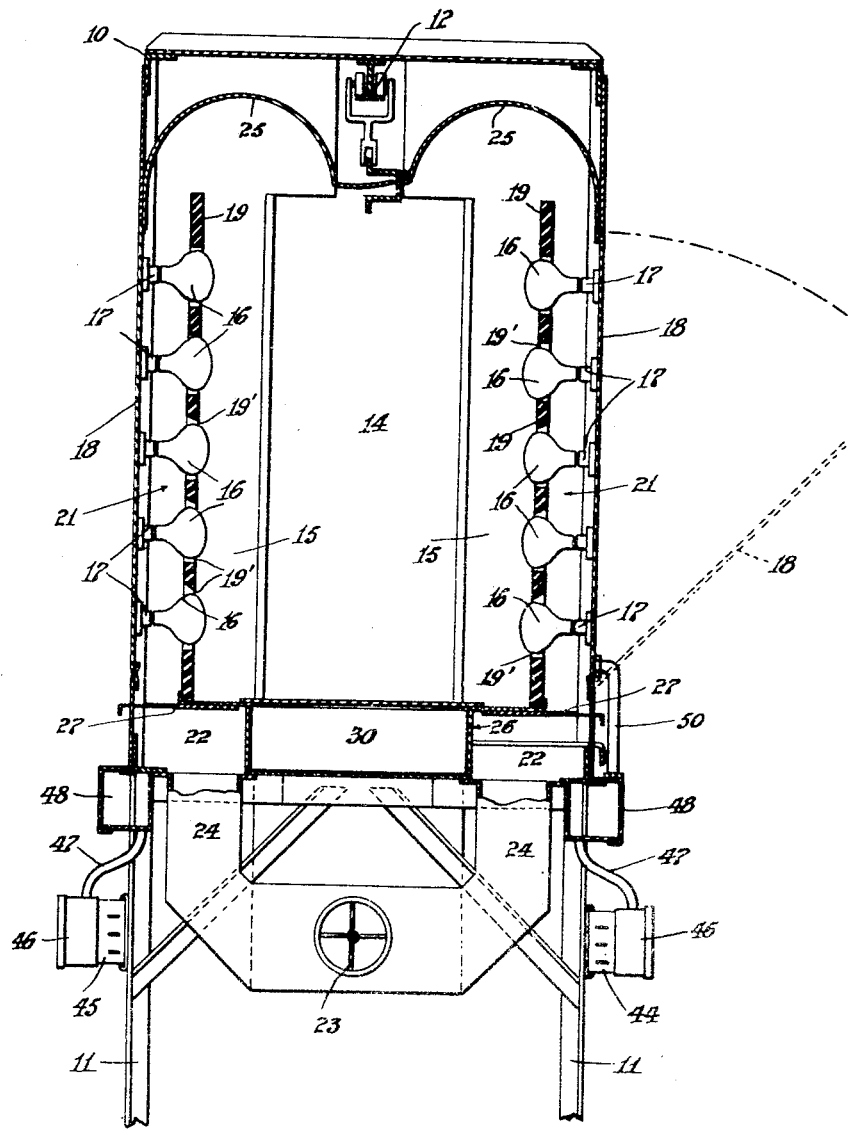

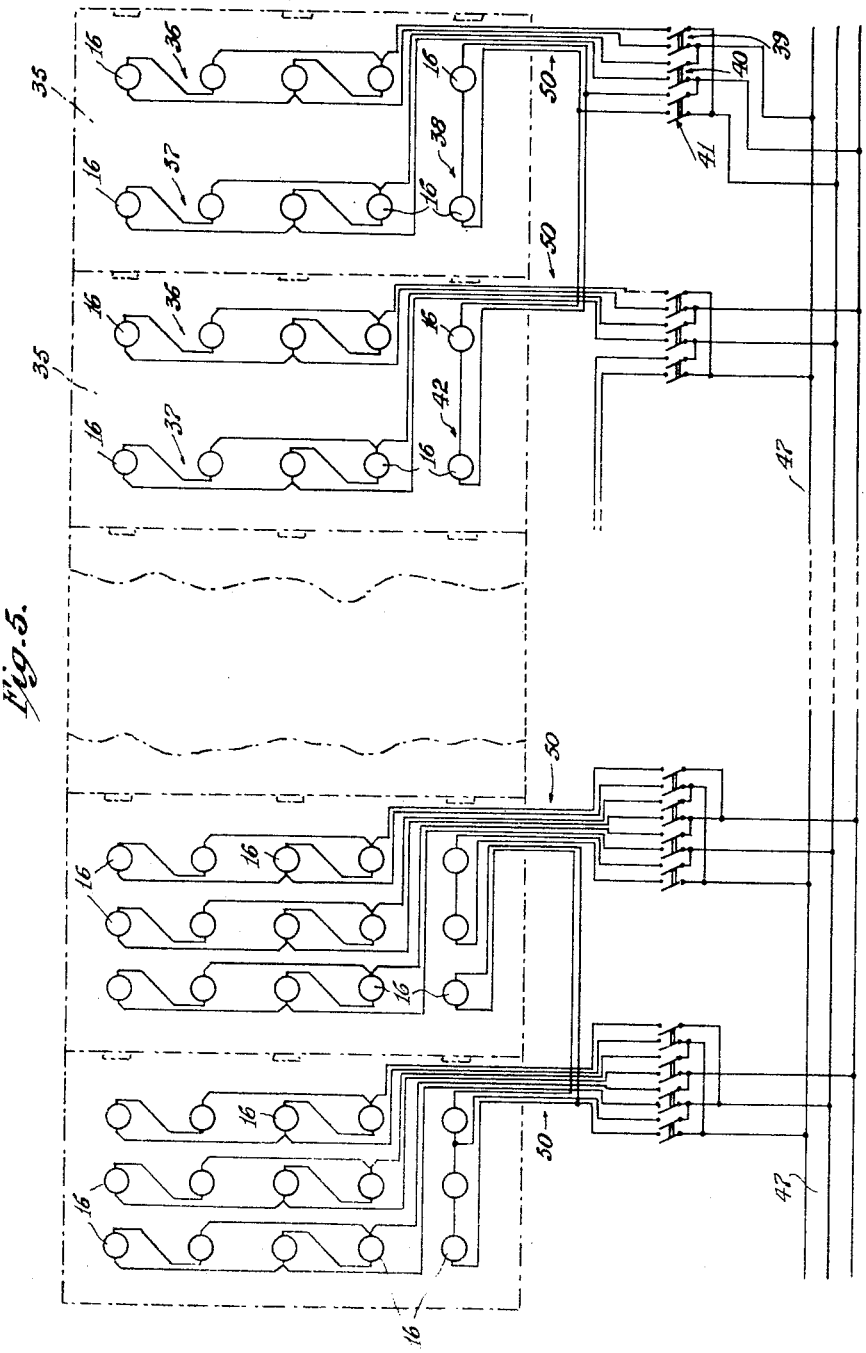

Patented Feb. 28, 1950

2,498,878

UNITED STATES PATENT OFFICE 2,498,878

INFRARED BAKING OVEN

Elmer T. Carlson, Wyoming, Ohio, assignor to The Trumbull Electric Manufacturing Company, Plainville, Conn., a corporation of Connecticut Application May 2, 1944, Serial No. 533,816

5 Claims. (Cl. 34—60)

My invention relates to ovens for baking various kinds of work especially by infrared rays. One object is to provide a suitable oven for handling articles being moved continuously by a conveyor.

Another object is to protect the lamps and sockets from overheating.

Another object is to facilitate inspection and replacement of the lamps.

Another object is to utilize the heat exchange of the protective system for heating the work.

An object is to be able to control the rate of treatment at various points.

The oven requires a housing forming a chamber through which the articles to be treated are conveyed. Along the inner walls are arranged banks of lamps with thermally insulating shields through which the lamps project toward the articles to be treated. Air is forced through the space behind the shields and over the sockets of the lamps so as to keep them from overheating. This air is thus heated and is forced over the top of the shields and into the chamber through which the articles are passing, thus adding indirectly to the direct heat effect of the lamps. Some of the air from the socket space also passes through the lamp openings around the lamp bulbs and into the heating chamber. The heated air is then drawn or forced out of the heating chamber.

The lamps are preferably arranged in banks on panels which can be readily opened for access to the lamps and sockets. Electric current is supplied in ducts alongside of the oven and suitable plug-in connectors and switches are provided so as to make it possible to connect any number of groups of lamps in circuit as may be required for controlling the rate of application of heat to the articles traveling through the oven.

Fig. 1 is a side view on a small scale showing typical parts of an oven embodying one form of my invention.

Fig. 2 is a side view on a larger scale of a portion of the oven, parts being broken away.

Fig. 3 is a plan and partial horizontal section of the same.

Fig. 4 is a transverse sectional view of the same.

Fig. 5 is a diagram of electric circuits for an oven embodying my invention.

The housing 10 is supported on posts 11 and is closed at the top and may have a conveyor track 12 extending lengthwise of it near the top. For convenience in loading, an entrance hood 13 is provided extending down toward the floor level and a similar hood (not shown) may be provided at the exit end. The heating chamber 14 is partially closed by a partition 15 at each end which has an opening large enough to allow the work to pass through.

Banks of lamps 16 are supported in sockets 17 along each side and face toward the heating chamber. These lamps are preferably arranged in groups on panels 18 which are movable or removable so as to facilitate installation, inspection and repair. These panels may be hinged at either end or side for convenience as conditions may require.

Insulating partitions 19 serve as thermal shields for the lamps. They are constructed and located so as to provide holes 19' for the respective lamp bulbs preferably at the position of the maximum diameter of the bulb, the holes being slightly larger than the bulbs so that the bulbs will not touch them. These shields may be supported by the vertical studs 20 in position to provide spaces or channels 21 for cooling air to be blown up from the air ducts 22 around the lamp sockets and stems. The lamps may of course be provided with the usual silver or other reflective surfaces or devices.

Cooling air is forced by a blower 23 into the feed duct 24 and thence to the distributing ducts 22 and the cooling channels or spaces 21 and deflected downward by the curved walls 25 at the top into the heating chamber 14. The air thus picks up heat from the lamps and sockets and prevents them from overheating. The air thus heated is delivered to the heating chamber and added to the heat created by the direct action of the lamps. In other words the heat created in the sockets and stems and ordinarily injurious to the lamps and sockets is transferred to useful work in the heating chamber. Valves or dampers 26, 27 are provided wherever needed to control the flow of air through the ducts 22 or the channels 21.

Air may be drawn out from the bottom of the heating chamber through the discharge duct 30 by an exhaust fan 31. This exhaust may be controlled by a damper or valve 32.

The lamps may be arranged in banks or groups of any number desired. For instance in Fig. 5 there are five lamps in each vertical bank. Each of the right hand panels 35 has two vertical groups 36 and 37 of four each and a lower group 38 of two lamps. Each of these groups 36, 37 has a switch such as 39, 40 which controls the lamps in its group. Switch 41 controls group 38 and also group 42 in the next panel. At the left hand part of the oven each panel has three groups of four lamps, one group of two lamps and one single lamp. In this way it is possible to localize the heating action at any position desired so as to apply more or less heat to articles above or below or to apply more or less heat at the entrance or later on in the passage of the work through the oven and thus control the rate of application for the best results. Switches of course are suitably provided.

Current is supplied from bus bar ducts 44, 45 extending along below the sides of the oven for convenience. Suitable plug-in connectors 46 are applied at convenient places and the cables 47 run into cable ducts 48. The groups of switches such as 39, 40, 41 are mounted on duct 48 and cables 50 lead to the lamps on the respective panels.

The use of infrared ray lamp treatment has proved most effective in baking paint and other protective coatings on various metallic surfaces. The present invention and especially the arrangement for cooling the sockets and lamps has proved most valuable in maintaining uniformity of action, prolonging the life of the lamps and facilitating inspection and replacement.

The casing has a central heating chamber through which the articles to be treated are passed and a channel or chamber on each side containing lamp sockets. The insulating partitions 19 separate the socket chambers from the heating chamber. In the preferred form part of the cooling air passes through the openings in the partitions around the lamp bulbs and part of it passes over the top of the partitions and downward into the heating chamber thus providing a uniform circulation so that the lamp sockets and stems are kept from overheating and the heat units absorbed in the socket chamber are transferred to the heating chamber together with the heating effect produced by the infrared ray lamps.

In case it is desired to heat only one side of the article or articles it may not be necessary to use but one bank of lights along one side of the heating chamber.

I claim:

1. A baking oven having a heating chamber with a conveyor along the top, a series of lamps and sockets arranged along at least one wall of the chamber, an insulating shield having passages for the lamps and spaced apart from the adjacent wall to provide a cooling chamber, a deflector extending from the top of the wall over the cooling chamber to a point adjacent the conveyor and means for forcing cooling air upward through said cooling chamber past said sockets and through said passages around said lamps whereby the incoming air absorbs heat from the lamps and the air thus heated is returned to the heating chamber.

2. A baking oven having a heating chamber with side walls, a series of lamps and sockets arranged along at least one wall of the chamber, an insulating shield having passages for the lamps and spaced apart from the adjacent wall to provide a cooling chamber, a deflector extending from the top of the wall over the shield to a point adjacent the top of the heating chamber and means for forcing air upward through said cooling chamber past said sockets and beneath said deflector and into the heating chamber whereby the incoming air absorbs heat from the lamps and the air thus heated is returned to the heating chamber.

3. A baking oven employing electrically heated lamp bulbs and having a casing with a central heating chamber through which articles to be baked are passed, the walls of the casing being formed of independently retractable panels carrying lamp sockets and the heating bulbs, partitions within the casing spaced apart from said panels and provided with openings to receive the ends of the respective lamp bulbs but larger than the lamp bulbs so as to provide air circulation channels around the sockets and lamp bulbs and passages through said openings around said bulbs to said heating chamber and means for forcing air through said air circulation channels and said passages around the sockets and lamp bulbs and into said heating chamber, said panels being retractable so as to permit inspection and replacement of sockets and bulbs carried by each panel independently without interrupting the operation of the oven.

4. A baking oven comprising a casing having a longitudinal baking chamber with oppositely disposed outer side walls composed of discrete movable panels and inner insulating partitions, vertical studs arranged along the opposite sides of the casing and supporting said partitions and spacing the partitions from the panels so as to provide vertical air channels between the respective studs, a number of lamp sockets carried by each panel and movable with the panels to provide access to the respective sockets and and channels, the sockets being arranged one above the other, said partitions having openings registering with the lamps in the sockets of respective panels when the panels are closed and means for circulating air through said channels to cool the sockets of the lamps in the sockets and forcing air through said passages into the opposite sides of the baking chamber.

5. A baking oven having oppositely disposed inner and outer side walls with a baking chamber between the inner walls, spaced vertical studs between the inner and outer walls dividing the spaces between the respective walls into vertical cooling channels between the inner and outer walls, the inner walls having passages arranged in rows, sockets for heating lamps carried by the outer walls in said channels and registering with the respective passages so that the lamps when mounted in the sockets will project into said passages and means for forcing air upwardly through said cooling channels around the sockets and inwardly to the heating chambers through the passages for the lamps whereby heat absorbed from the sockets and lamps supplements the heat radiated from the lamps.

ELMER T. CARLSON.

REFERENCES CITED

The following references are of record in the file of this patent:

UNITED STATES PATENTS

| Number | Name | Date |
|---|---|---|
| 375,915 | Barrett et al. | Jan. 3, 1888 |
| 1,006,767 | Mauger | Oct. 24, 1911 |
| 1,519,287 | Woodson | Dec. 16, 1924 |
| 2,072,205 | Halpern | Mar. 2, 1937 |
| 2,145,798 | Merkel | Jan. 31, 1939 |
| 2,263,866 | Barber | Nov. 25, 1941 |
| 2,325,050 | Goodwin et al. | July 27, 1943 |
| 2,325,086 | Vore | July 27, 1943 |
| 2,340,354 | Wells | Feb. 1, 1944 |
| 2,347,407 | Goodwin et al. | Apr. 25, 1944 |
| 2,387,804 | Miskella | Oct. 30, 1945 |